United States Patent [19]

Franke

[11] Patent Number: 4,627,530

[45] Date of Patent: Dec. 9, 1986

[54] ELEVATING CHAIN CONVEYOR

[75] Inventor: Walter Franke, Fremont, Calif.

[73] Assignee: Universal Conveyor Co., Inc., Fremont, Calif.

[21] Appl. No.: 748,057

[22] Filed: Jun. 24, 1985

Related U.S. Application Data

[63] Continuation of Ser. No. 543,854, Oct. 20, 1983, abandoned.

[51] Int. Cl.⁴ .............................................. B65G 17/16
[52] U.S. Cl. .................................................... 198/799
[58] Field of Search ............................... 198/796–802; 414/78

[56] References Cited

U.S. PATENT DOCUMENTS

| 2,681,728 | 6/1954 | Boron | 198/822 X |
| 3,024,891 | 3/1962 | Sawrie | 198/799 |
| 3,184,039 | 5/1965 | Czarnecki | 198/799 |
| 3,481,449 | 12/1969 | Leach | 198/799 |
| 3,756,378 | 9/1973 | Kuehl et al. | 198/799 |

FOREIGN PATENT DOCUMENTS

| 2443985 | 8/1980 | France | 198/799 |
| 1446859 | 8/1976 | United Kingdom | 198/799 |

Primary Examiner—Robert J. Spar
Assistant Examiner—Lyle Kim

[57] ABSTRACT

A continuous conveyor is provided having horizontal and vertical runs wherein articulated carrier members are combined with spacing members so that on horizontal runs a continuous belt is formed without gaps and wherein the separators form a supporting lip for the horizontal carriers during vertical runs.

8 Claims, 8 Drawing Figures

ELEVATING CHAIN CONVEYOR

This application is a continuation of application Ser. No. 543,854, filed Oct. 20, 1983, now abandoned.

SUMMARY OF THE INVENTION

Many conveyors have been proposed wherein a series of carrier members are supported from opposite ends on two endless chains wherein the sprockets for the endless chain are displaced substantially by the length of a carrier member during horizontal movement so that the carriers remain horizontal regardless of whether they are moving horizontally or vertically.

The main problem with such conveyors in the past has been that in order to provide clearance when going from a vertical to a horizontal path or vice versa, it is ordinarily necessary that the carriers be separared by some distance in order to provide clearance when, for instance, one carrier moves up and another carrier moves under it. Such conveyors are not suitable for use with continuous loading devices since articles would fall between the carriers if they were merely pushed onto the conveyor line without regard to the position of the carriers.

In accordance with the present invention separators are provided between the carriers, the separators serving two different purposes. In the first place, the separators provide a continuous surface completely without gaps, as the carriers are moved along a horizontal path. In the second place, as articles are loaded onto the continuously moving conveyor, some will land on the separators. Now as the path is changed from horizontal to vertical, the separators will slowly articulate upwardly, pushing the articles back onto the carrier. This employment of the separators between carriers also permits one to convey articles off of the conveyor onto a stationary or moving platform without the possibility of the articles falling back down the shaft.

Another feature of the present invention is that an endless belt can be used to discharge articles on the continuous conveyor, wherein the endless belt is narrower than the carriers so that, after the articles move onto a carrier, they can move out to the sides. This is possible since the carriers have upstanding sides which prevent articles from moving off of the carriers at the sides.

Such conveyors as have been used in the past have been suitable primarily for use with relatively large articles but the conveyor of the present invention is particularly adapted for moving small articles, although the articles can be of almost any size, including metal cans, glass bottles or jars, plastic containers, boxes of almost any size, bags such as flour, sugar or the like, round containers or odd shapes such as square or triangular containers, suitcases and the like.

Another advantage of the present invention is that the carriers are articulated so that the carrierrs can pass around a shaft after discharging their contents and move in a vertical path so that the conveyor of the present invention can be made very compact.

Another advantage of the invention is that the conveyor may be used in various combinations of vertical and horizontal paths so that it can be used to lower articles, to raise articles over an obstacle, to raise articles or to start at one level, move to another level and finally move to a third level which may be lower or higher than the first level.

Various other features and advantages of the invention will be brought out in the balance of the specification.

DESCRIPTION OF A PREFERRED EMBODIMENT

Figure 1:
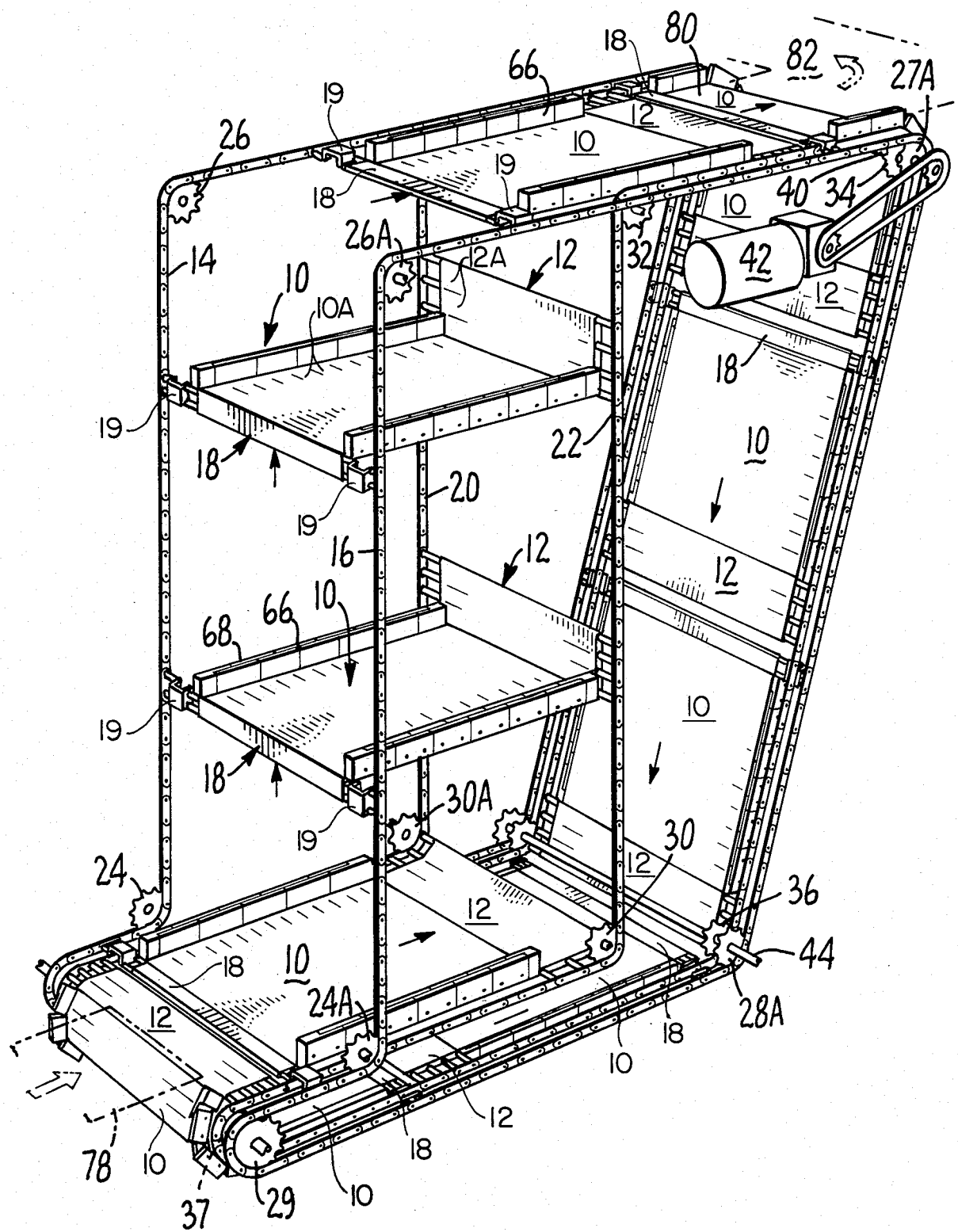
FIG. 1 is a perspective view of a conveyor embodying the present invention.

Referring to the drawings by reference characters, the conveyor of the present invention includes plural spaced-apart pluralities of continguous support members 10A forming a plurality of carriers generally designated 10 along with a series of contiguous separator elements 12A forming each of a plurality of separators generally designated 12, all of which are carried on two pairs of chains. The first or outer pair of chains designated 14 and 16 are attached to the rear of a carrier by a support means such as cross member 18 while a second or inner pair of chains designated 20 and 22 carry the front end of the carrier by another support means. Separators 12 precede the front end of each carrier 10 and are also connected between the second chains 20 and 22. The first set of chains is trained around a first set of sprockets such as 24, 24A, 26, 26A, 27A and 28A, while the second set of chains is trained around a second set of sprockets such as 30, 30A, 32, 34 and 36. At those points on the path of travel where the two chains follow the same path, sprockets for the two chains can be on the same shaft. Thus, sprockets 34 and 27A are affixed to the shaft 40 which is driven from a motor or other prime mover 42. Similarly, sprockets 28A and 36 are mounted on shaft 44.

The separators 12 comprise special leaf-type chain members 12A, as shown in the drawings, mounted between chains 20 and 22 in the forward direction of travel of each carrier 10. Several such separators 12 are illustrated, one for each carrier, as shown. The leading edge of the each carrier 10 is mounted on chains 20 and 22 contiguous with respective separators 12. The trailing edge of each carrier 10 is mounted on a second support means such as cross bar 18, later described in detail.

During a horizontal run of the conveyor, the sprockets for the two chains are on a horizontal plane and adjacent one another. For instance, sprockets 24 and 30 occupy the same horizontal plane, as to sprockets 26, 32, 34 and 27. During a change in vertical direction wherein the carriers are loaded, the sprockets for the two chains are separated by the length of a carrier. Thus, sprockets 24 and 30 are separated in a horizontal dimension by the length of a carrier 10 as are the sprockets 26 and 32. After the carriers have been unloaded and it is desired to merely return them empty to the initial loading position, the sprocket can be mounted on the same shaft. Thus sprockets 27A and 34 are mounted on shaft 40, as previously described, while sprockets 28A and 36 are mounted on shaft 44, almost directly below. Thus both the carriers and separators move downwardly along a path with the chains adjacent one another. This substantially reduces the space which the conveyor occupies since the downward journey is made with all of the elements between the chains in a flattened or coplanar condition. At all times the ends of the carriers are supported on the pitch line of the chains.

The separators which were generally designated as 12 comprise one or more bars which extend from one side to the other typified (see FIG. 4) by bar 46 mounted on shaft 48, the two ends of the shaft being attached to the chains 20 and 22. In the embodiment illustrated, three of the separator bars have been employed, but it will be obvious that a fewer or larger number could be used.

Figure 3:
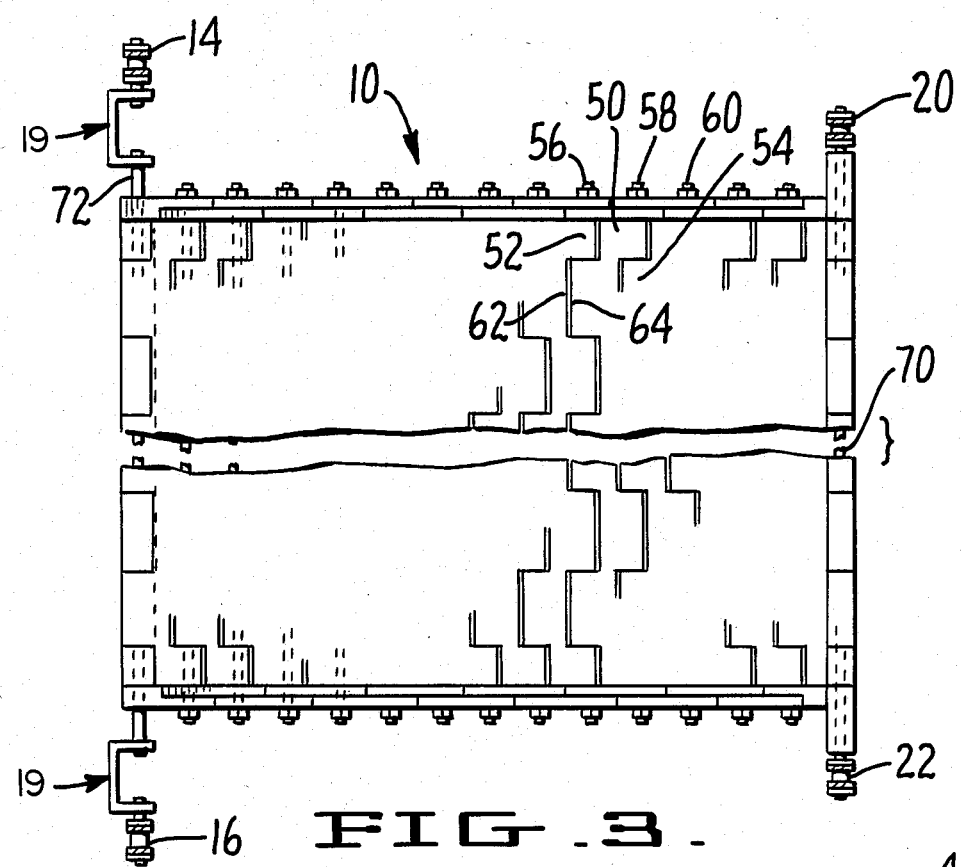
FIG. 3 is a plan view of one of the articulated carriers.
Figure 4:
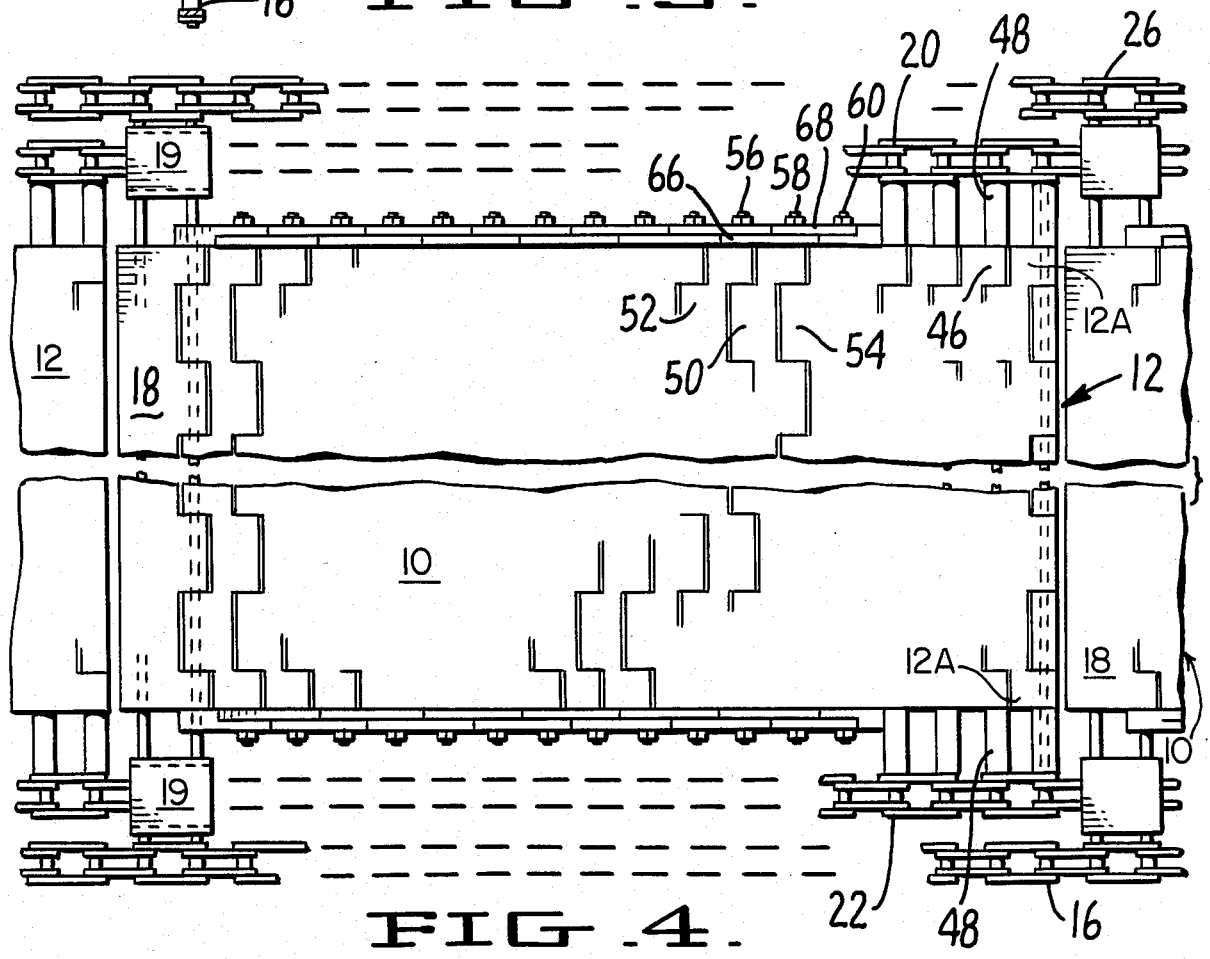
FIG. 4 is a plan view of a carrier unit showing the method of attachment to the drive chains.
Figure 5:
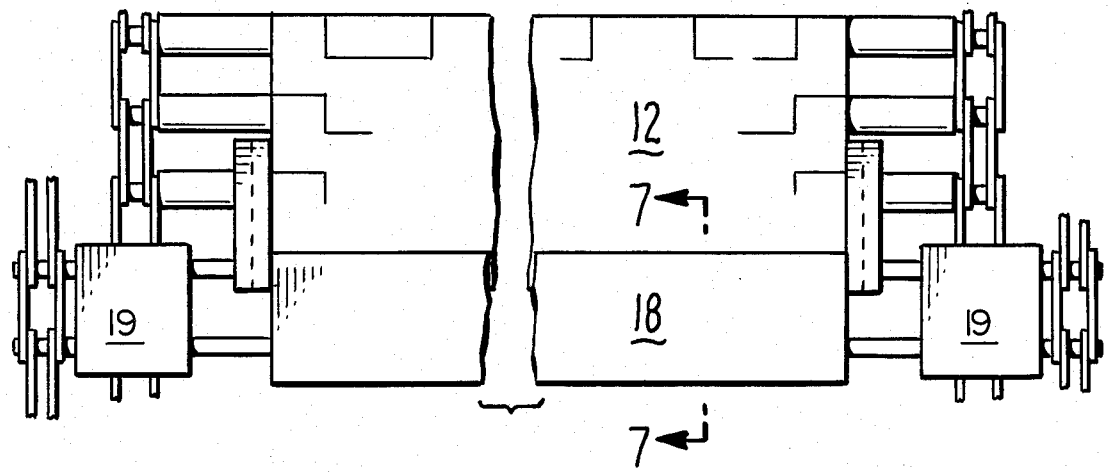
FIG. 5 is a partial elevation view.
Figure 6:
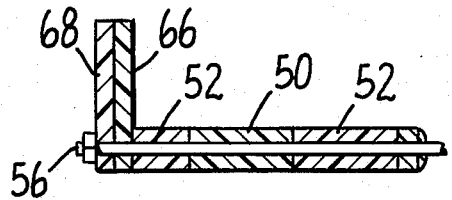
FIG. 6 is a partial section on the line 6—6 of FIG. 2.
Figure 7:
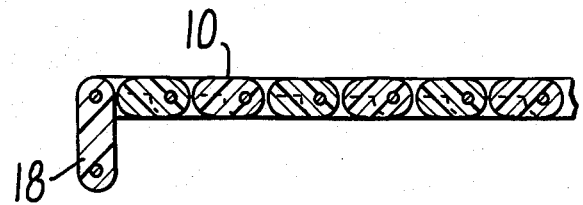
FIG. 7 is a partial section on the line 7—7 of FIG. 5.

The carriers themselves, which have been generally designated as 10, are composed of special leaf-type chain members 10A which are adapted to pivot in one direction and not the other. Thus, each carrier, when supported from the ends, will support a load placed in the middle, yet if an upward force is provided at the middle, it will pivot freely. This structure is best seen in FIGS. 3, 4 and 6 where a typical cross member 50 has a stair step configuration which interlocks with adjoining members 52 and 54. Each of the members is mounted on two adjacent shafts, typical shafts being designated 56, 58 and 60. Each shaft interlocks two adjacent cross members so that shaft 56 passes through both the member 52 and the member 50. Similarly, the shaft 58 passes through the member 50 as well as 54. The cross members are relieved as at 62 and 64. This provides an articulated structure so that the carriers can articulate in an upward direction.

In order to provide a load supporting structure, interlocking side members are employed. These upstanding side members interlock in such a manner that the pallet will support a load when supported at the ends but will bend freely in the opposite direction. Referring specifically to FIG. 4, the side member 66 bridges shafts 56 and 58 while member 68 bridges shafts 58 and 60. Each of the side members thus embraces two adjacent shafts and each shaft has two side members thereon in staggered relationship. Thus, the side members in their interlocking relationship allow what is essentially a chain to flex freely in one dimension and to become rigid in the other dimension. The leading edge of each carrier 10 is affixed to a first support means such as shaft 70 which in turn is attached at opposite ends to the chains 20 and 22. The trailing edge of the carrier 10 is attached to a shaft 72 which is connected to a second support means such as cross member 18. The cross members 18 have U-shaped ends 19 enabling the member to pass over the inner sprockets, e.g. 32. Cross members 18 are connected to two adjacent links in the drive chains 14 and 16 for additional strength and have a substantially continuous surface across the conveyor path.

Figure 2:
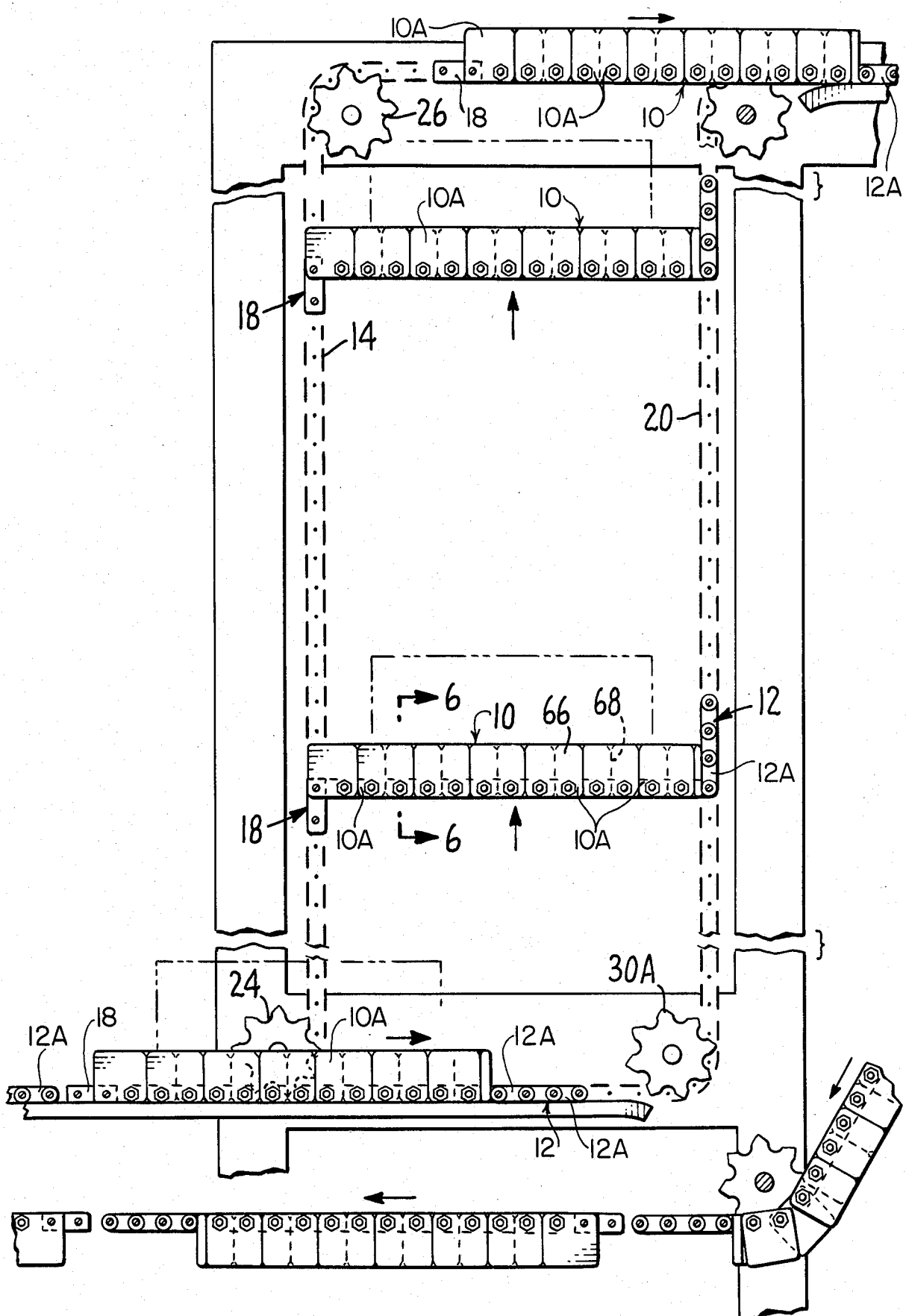
FIG. 2 is an enlarged partial side view of a portion of the conveyor shown in FIG. 1.

As can best be seen from FIGS. 1 and 2, when the conveyor is moving in a horizontal plane, there is no gap between adjacent sections. Normally the feed point, shown in phantom in FIG. 1, is narrower than the width of the conveyor so that if goods are delivered onto the conveyor, they will spread sideways to fill the width of the conveyor. Thus, it will be seen that the feed point 78 is considerably narrower than any of the carriers 10.

Also, it will be seen that there is no gap between adjacent sections so that no goods will fall off if they are delivered between carriers. Some of the goods will undoubtedly be delivered onto the separator elements 12 but, as the carrier moves forward, see the bottom carrier in FIG. 1, the leading edge of the separator elements moves gently upwardly which would push any articles on the separator element back onto the carrier proper. Also, as the carrier moves upwardly, the separator element provides an effective front wall so that articles will not move off. It should also be noted that the side members, such as 66, which prevent the chain from flexing in the opposite direction, also serve as effective side barriers to hold articles onto the conveyor.

One of the features of the present invention is that it is easy to provide an unloading mechanism. Thus, referring to the upper righthand portion of FIG. 1, a carrier 80 is shown discharging onto a transfer mechanism 82. As the carrier bends, the goods are transferred onto the conveyor 82.

Figure 8:
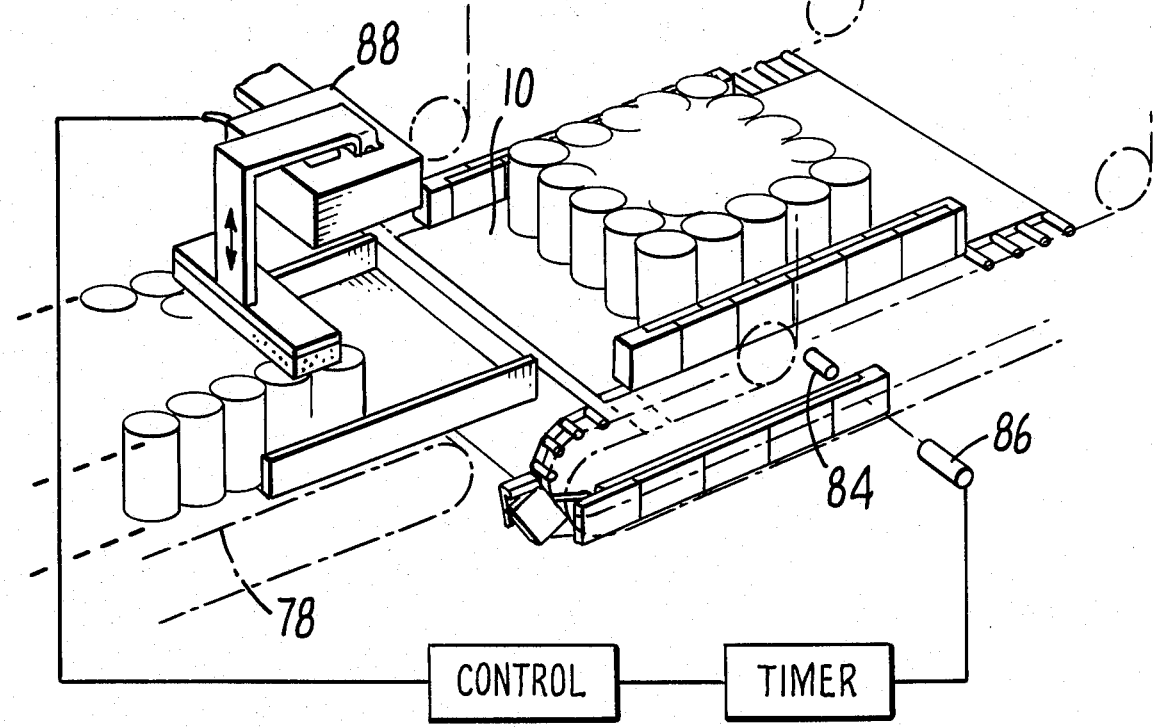
FIG. 8 is a perspective view of a portion of the conveyor shown a timing mechanism for loading the carriers upon a conveyor.

Although loading can be continuous, under many circumstances it is desired to provide a timer so that the goods will be transferred onto the conveyor only at such times as a carrier is present and not between carriers. Thus, referring specifically to FIG. 8, a photo-optical pair is provided by the light source 84 and pickup 86 and, when the light path is interrupted by the side members from the carrier, the timer and control actuate the release mechanism 88. Between carriers the light path is reestablished so that the control mechanism 88 cuts off the flow of material being loaded onto the carrier.

I claim:

1. A conveyor for moving articles from one level to another as well as in a horizontal path, comprising, in combination:

first and second pairs of endless chains arranged on a plurality of sprockets around a path including horizontal and vertical runs, with one of each pair of chains being on one side of said path and the other of each pair being on the opposite side of said path, plural spaced-apart pluralities of contiguous support members extending from one side of the path to the other, each plurality of contiguous support members combining to form a substantially continuous-surface articulated carrier which is rigid to support a load when the carrier is supported from its ends, first support means extending from one side of the path to the other for supporting a respective first end of each of said continuous-surface carriers, the opposite ends of each said first support means being each connected to a respective one of said first pair of endless chains, at least one separator element having a substantially continuous surface extending across said path with opposite ends thereof being supported by said first pair of chains to form an articulated separator having a substantially continuous surface and being substantially contiguous with the said first end of each respective carrier, and second support means extending from one side of the path to the other for supporting a respective second end of each of said continuous-surface articulated carriers, the opposite ends of each said second support means being each connected to a respective one of said second pair of endless chains, said second support means extending across said path and being substantially contiguous with the said second end of the respective carrier, adjacent ones of said plural spaced-apart continuous-surface carriers being substantially coplanar with each other and with the respective separator and second support means therefor when the chains on each side of said path lie adjacent one another, and the space between each adjacent pair of said spaced-apart coplanar carriers being substantially filled with a respective pair of said separator elements and second support means, the contiguous substantially continuous surfaces of all said carriers, separators and support means thus providing a substantially continuous surface when said chains lie adjacent one another, whereby articles transported by said spaced-apart carriers cannot fall therebetween, said separators and said second support means serving to provide with said carrier means a substantially continuous surface when the respective chains lie adjacent one another, said separators also serving as an abutment when the chains are separate from each other and the carriers are one above another.

2. The conveyor of claim 1 wherein the carriers are supported on the pitch line of the chains.

3. The conveyor of claim 1 wherein the carriers are composed of interlocking step-like members with rods connecting each two adjacent members.

4. The structure of claim 1 wherein the carriers have a double row of upstanding side plates, each side plate being connected to two adjacent members and each row being staggered with respect to the other.

5. A conveyor for moving articles from one level to another in accordance with claim 1, wherein each said separator articulates upwardly out of the plane of each contiguous carrier immediately prior to the vertical alignment of said contiguous carrier with another of said carriers, whereby said separators provide a continuous lip contiguous with the leading edge of each respective carrier for restraining articles being transported by said carrier means.

6. A conveyor for moving articles from one level to another as well as in a horizontal path in accordance with claim 1, wherein adjacent ones of said plural spaced-apart carrier means are vertically superposed for elevating articles when the respective chains of said first and second pairs are all vertical and spaced apart from each other.

7. A conveyor for moving articles from one level to another as well as in a horizontal path in accordance with claim 6, wherein the respective separator for each said superposed carrier means lies in a vertical plane contiguous with the respective first end of each said carrier means, whereby each said first support means has the additional function of providing a continuous, contiguous lip for restraining articles being transported by said carrier means.

8. A conveyor for moving articles from one level to another as well as in a horizontal path, in accordance with claim 7, wherein the respective second support means for each said superposed carrier means also lies in a vertical plane.

* * * * *